(12) United States Patent
Ooka

(10) Patent No.: US 7,484,611 B2
(45) Date of Patent: Feb. 3, 2009

(54) SPEED CHANGE GEAR WITH DOG CLUTCH PAWL, AND METHOD AND DEVICE OF MANUFACTURING THE SAME

(75) Inventor: Junichi Ooka, Nagoya (JP)

(73) Assignee: O-Oka Corporation, Toyota-shi (JP)

( * ) Notice: Subject to any disclaimer, the term of this patent is extended or adjusted under 35 U.S.C. 154(b) by 0 days.

(21) Appl. No.: 10/854,183

(22) Filed: May 27, 2004

(65) Prior Publication Data

US 2005/0263368 A1    Dec. 1, 2005

(51) Int. Cl.
*F16D 11/00* (2006.01)
*F16H 15/02* (2006.01)
*B21K 1/30* (2006.01)
*B21J 13/02* (2006.01)

(52) U.S. Cl. .......................... 192/108; 74/431
(58) Field of Classification Search ............... 192/114 T
See application file for complete search history.

(56) References Cited

U.S. PATENT DOCUMENTS 3,550,738 A * 12/1970 Halibrand ................... 192/108
4,938,089 A * 7/1990 Ohoka ........................ 192/108
5,363,714 A * 11/1994 Hoguchi ..................... 192/108
5,870,923 A * 2/1999 Eisen et al. .................. 72/377

FOREIGN PATENT DOCUMENTS

| JP | 01-120429 | 5/1989 |
| JP | 06-079395 | 3/1994 |
| JP | 2003-154434 A * | 5/2003 |

* cited by examiner

*Primary Examiner*—Rodney H Bonck
(74) *Attorney, Agent, or Firm*—Oblon, Spivak, McClelland, Maier & Neustadt, P.C.

(57) ABSTRACT

A speed change gear with dog clutch pawls projected on a side surface of a gear body having a speed change gear part on an outer peripheral surface thereof, and a method and a device of manufacturing the same, in which the dog clutch pawls are provided with back tapers on at least engaging surface thereof, and the dog clutch pawls with back tapers and the change gear part are integrally molded by forging.

6 Claims, 7 Drawing Sheets

SPEED CHANGE GEAR WITH DOG CLUTCH PAWL, AND METHOD AND DEVICE OF MANUFACTURING THE SAME

BACKGROUND OF THE INVENTION

1. Field of the Invention

The present invention relates to a speed change gear with dog clutch pawls for a mechanism of a dog clutch entirely adopted in a transmission of a two-wheeled vehicle.

2. Description of the Prior Art

A mechanism having a dog clutch is known which comprises a pair of sides which includes a male side having projected dog clutch pawls and a female side having a concave portion or window hole-type dog clutch holes and back tapers were formed on engaging surfaces of the dog clutch pawls or the window hole-type dog clutch holes in order to prevent an escape thereof from engaging surfaces.

A method of molding a male side of a speed change gear with dog clutch pawls comprises cutting a virgin material in order to obtain a speed change gear part and dog clutch pawls provided with back tapers, or forming beforehand a preform on which straight-type dog clutch pawls having an outer peripheral surface in a direction parallel to an axial of speed change gear are projected by forging, and forming back tapers on engaging surfaces of the straight-type dog clutch pawls by cutting.

It takes a great amount of time to cut a virgin material in order to obtain dog clutch pawls one by one, a great amount of shavings are generated, and in result an accuracy of products vary widely.

Moreover, it needs productive equipments for exclusive use, therefore it needs a high cost.

SUMMARY OF THE INVENTION

It is a general object of the present invention to provide a speed change gear with dog clutch pawls having a well-established mechanism in order to obtain improvement of productivity and stabilization in quality.

It is another object of the present invention to provide a speed change gear with dog clutch pawls having a mechanism to prevent an escape from engaging surfaces.

It is a further object of the present invention to provide a speed change gear with dog clutch pawl, and a method and a device of manufacturing the same in which a back taper is formed by forging without cutting process and it is able to shorten the amount of molding time on a large scale and improve productivity.

It is a still further object of the present invention to provide a speed change gear with dog clutch pawl, and a method and a device of manufacturing the same in which a reveres taper surface formed by a punch with a taper or by constraining with a slide block has high accuracy and products have high reliability.

It is another object of the present invention to provide a speed change gear with dog clutch pawls projected on a side surface of a gear body having a speed change gear part on an outer peripheral surface thereof, in which the dog clutch pawls are provided with back tapers on at least engaging surface thereof, and wherein the dog clutch pawls with back tapers and the change gear part are integrally molded by forging.

It is a further object of the present invention to provide a speed change gear with dog clutch pawls in which the dog clutch pawls are axially projected on an axial end surface of the gear body having the speed change gear part on the outer peripheral surface thereof.

It is a still further object of the present invention to provide a speed change gear with dog clutch pawls in which the dog clutch pawls are positioned in an inner coaxial circle on the axial end surface thereof than the gear part of the gear body.

It is a yet further object of the present invention to provide a speed change gear with dog clutch pawls in which the dog clutch pawls are positioned at same intervals on the axial end surfaces thereof.

It is another object of the present invention to provide a method of manufacturing a speed change gear with dog clutch pawls, in which comprises a first step of molding a first molded article having plurality of projected dog clutch pawls having straight engaging surfaces projected on a side surface of a gear body having a speed change gear part on an outer peripheral surface thereof, and a second step of forming back tapers on engaging surfaces of the dog clutch pawls of the first molded articles from an outer part to a central part in the radial direction thereof, by punching of a punch with tapers therebetween.

It is a further object of the present invention to provide a method of manufacturing a speed change gear with dog clutch pawls, in which comprises a first step of molding a first molded article having plurality of projected dog clutch pawls having straight engaging surfaces projected on a side surface of a gear body having a speed change gear part on an outer peripheral surface thereof, and a second step of forming back tapers on engaging surfaces of the dog clutch pawls of the first molded article pressing a tip portion of the dog clutch pawls in the axial direction thereof.

It is another object of the present invention to provide a device for manufacturing a speed change gear with dog clutch pawls, in which comprise a first molding device for molding a first molded article having plurality of projected dog clutch pawls having straight engaging surfaces projected on a side surface of a gear body having a speed change gear part on an outer peripheral surface thereof, and a second molding device for forming back tapers on engaging surfaces of the dog clutch pawls of the first molded article from an outer part to a central part in the radial direction thereof, by punching of a punch with tapers therebetween.

It is a further object of the present invention to provide a device for manufacturing a speed change gear with dog clutch pawls, which comprises a first device for molding a first molded article having a plurality of projected dog clutch pawls having straight engaging surfaces projected on a side surface of a gear body having a speed change gear part on an outer peripheral surface thereof, and a second device for forming back tapers on engaging surfaces of the dog clutch pawls of the first molded articles, by pressing a tip portion of the dog clutch pawls in the axial direction thereof.

It is a still further object of the present invention to provide a device for manufacturing a speed change gear with dog clutch pawls, in which the first molding device comprises a first drag having a discform cavity with inner peripheral surface for forming a tooth form of an outer peripheral part of a first molded article, for opening to a top surface thereof, formed therein, extrusion holes, for molding dog clutch pawls concentrically formed at a bottom surface of the cavity at equal intervals, having straight inner peripheral surfaces and a sleeve inserted reciprocatably at a center of the cavity thereof, and a first cope having a mandrel inserted and projected at the center of a pressure surface thereof.

It is a yet further object of the present invention to provide a device for manufacturing a speed change gear with dog clutch pawls, in which the second molding device comprises a second drag having a cavity corresponding to the first molded articles, taper punches, having taper surfaces on both sides of an edge part thereof, provided movably from an outer part thereof to a center part thereof on a radial direction and depression cam moving vertically in order to push the taper punch into the center part thereof, and a second cope comprising an inner punch formed at a part corresponding to an opening surface of the cavity on the second drag and an outer punch for depressing downwardly the depression cam.

It is a yet further object of the present invention to provide a device for manufacturing a speed change gear with dog clutch pawls, in which the taper punch has taper part at an outer end thereof and a spring for pressing outwardly the taper punch in the radial direction thereof, and the depression cam has taper part at a lower end and a spring for pressing upwardly the depression cam.

It is another object of the present invention to provide a device for manufacturing a speed change gear with dog clutch pawls, in which the inner punch has a spring, for pressing downwardly the inner punch, inserted between the inner punch and the outer punch.

It is a further object of the present invention to provide a device for manufacturing a speed change gear with dog clutch pawls, in which the second molding device comprises a second drag having a cavity corresponding to the first molded article, extrusion holes, for molding dog clutch pawls with taper surfaces, having a shorter depth and a wider width than the length and width of the straight molded dog clutch pawls, and a second cope comprising an inner punch formed at a part corresponding to an opening surface of the cavity on the second drag and an outer punch.

It is a yet further object of the present invention to provide a device for manufacturing a speed change gear with dog clutch pawls, in which the second molding device comprises a second drag having a cavity corresponding to the first molded articles, slide blocks for forming a back tapers of the dog clutch pawls by constraining both side surfaces of the dog clutch pawls between the opposed back tapers thereof, and a second cope comprising an inner punch formed at a part corresponding to an opening surface of the cavity on the second drag and an outer punch.

BRIEF DISCRIPTION OF THE DRAWINGS

DETAILED DESCRIPTION OF THE PREFERRED EMBODIMENTS

Figure 1A:
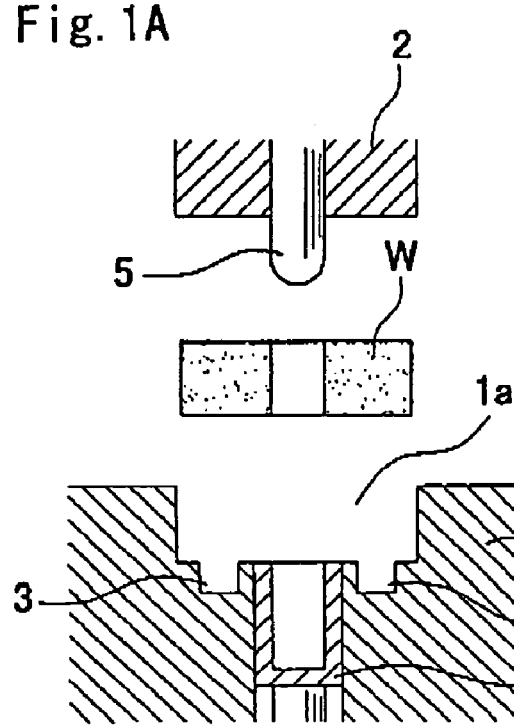
FIGS. 1A-1D are explanation views showing a first step of a manufacturing method of the present invention.

Referring to drawings, a speed change gear with dog clutch pawls and a method of manufacturing the speed change gear with dog clutch pawls of the present invention will be described.

FIG. 1 is a drawing showing a first step of a manufacturing method of the present invention. As shown in FIG. 1, a manufacturing device comprises drag 1 and cope 2 and a discform cavity 1a opening to a top surface of the drag 1 is formed at the drag 1. Extrusion holes 3.3 . . . for molding dog clutch pawls are concentrically formed at the bottom surface of the cavity 1a at equal intervals and the extrusion holes have straight inner peripheral surfaces.

A sleeve 4 is inserted at a center of the cavity 1a of the drag 1 and is capable of reciprocating. A mandrel 5 is projected at the center of a pressure surface of the cope 2.

Figure 1B:
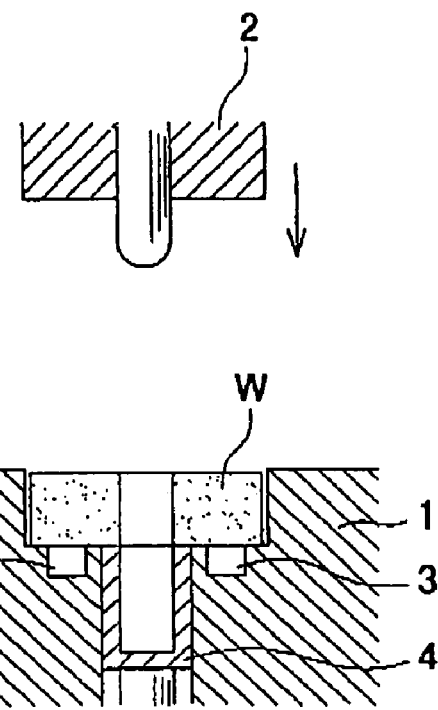
Figure 1C:
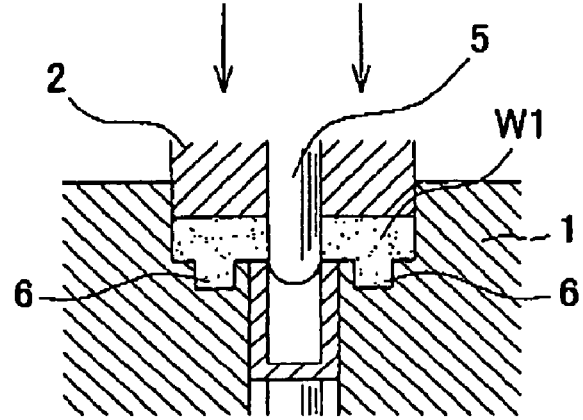

When a doughnut-type workpiece W is set in the cavity 1a (as shown in FIG. 1B) and the workpiece W is pressed by sending the cope 2 down, a metal of the workpiece W is extruded into the extrusion hole 3 and in result straight dog clutch pawls 6, 6 . . . are formed (as shown in FIG. 1C).

Figure 1D:
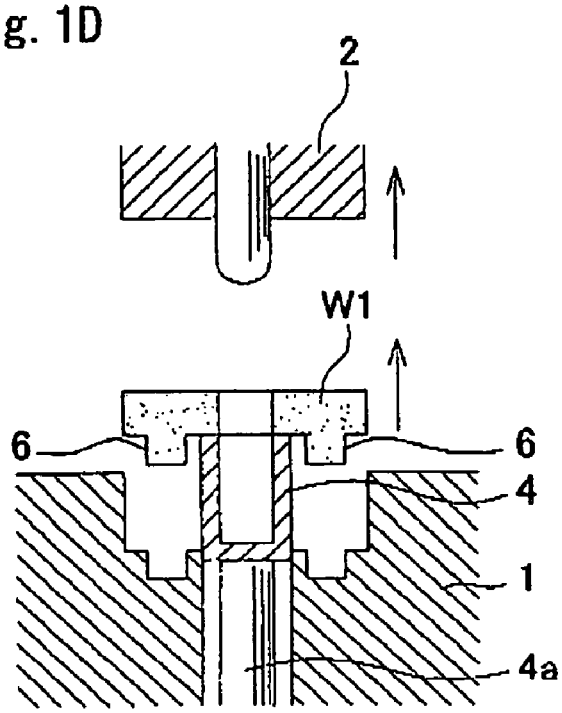

A first molded article W1, having dog clutch pawls formed straight dog clutch pawls 6.6 . . . projected on one side surface or one axial end surface of a gear body having a gear part, may be removed by uprising the sleeve 4 by pushing of a knockout pin 4a (as shown in FIG. 1D).

Figure 2A:
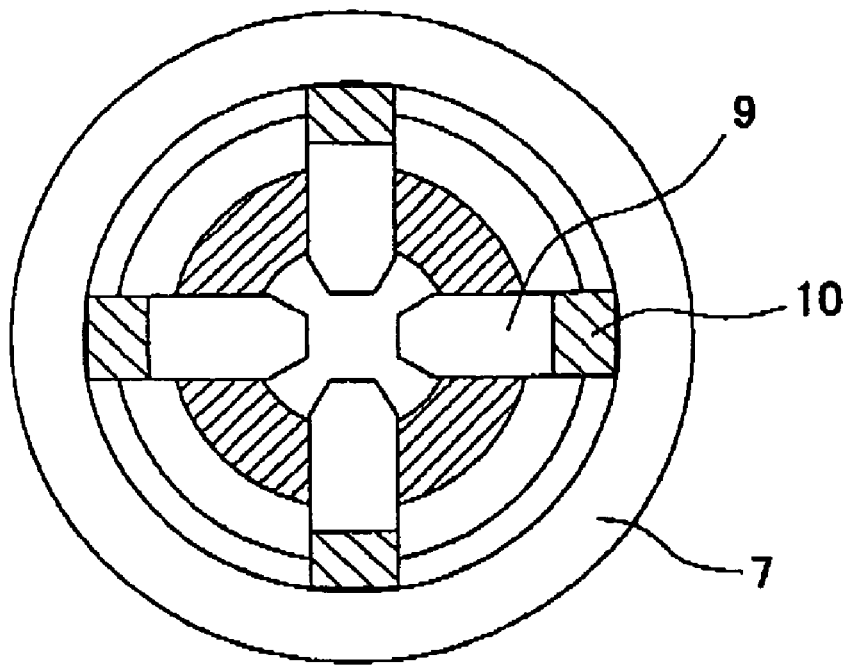
FIGS. 2A and 2B are explanation views showing a molding device which is used at a second step of a manufacturing method of the present invention.
Figure 2B:
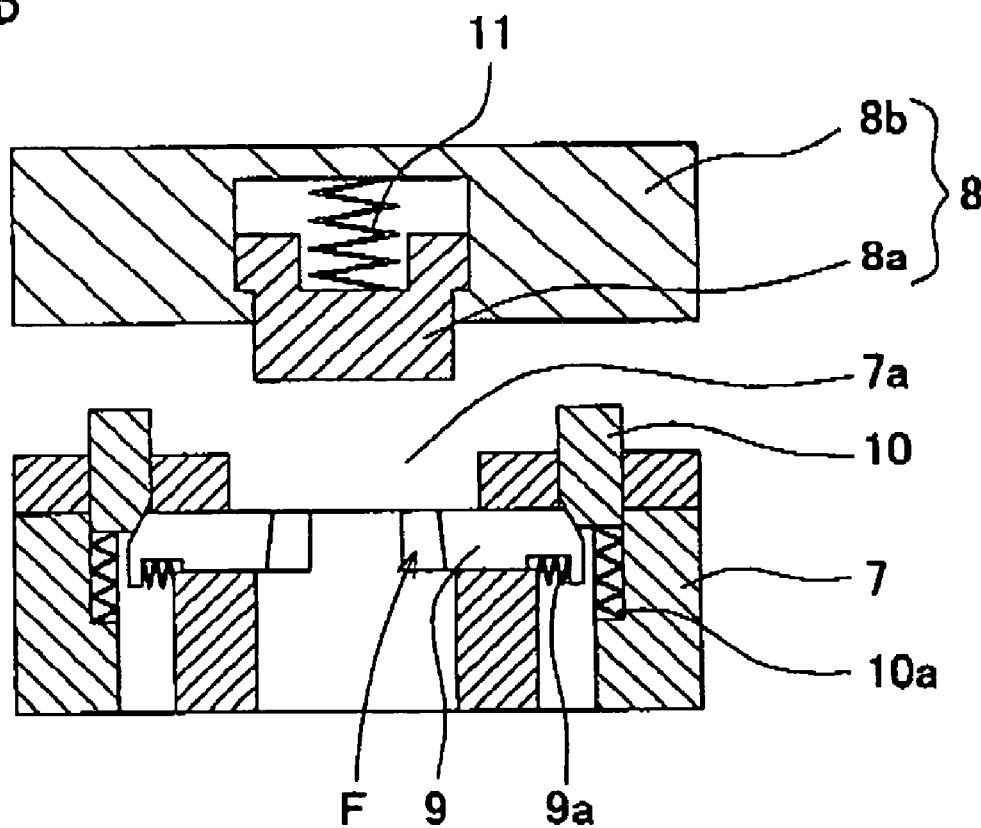

FIG. 2A and FIG. 2B show a molding device used at a second process and the molding device comprises a drag 7 and a cope 8.

Figure 3:
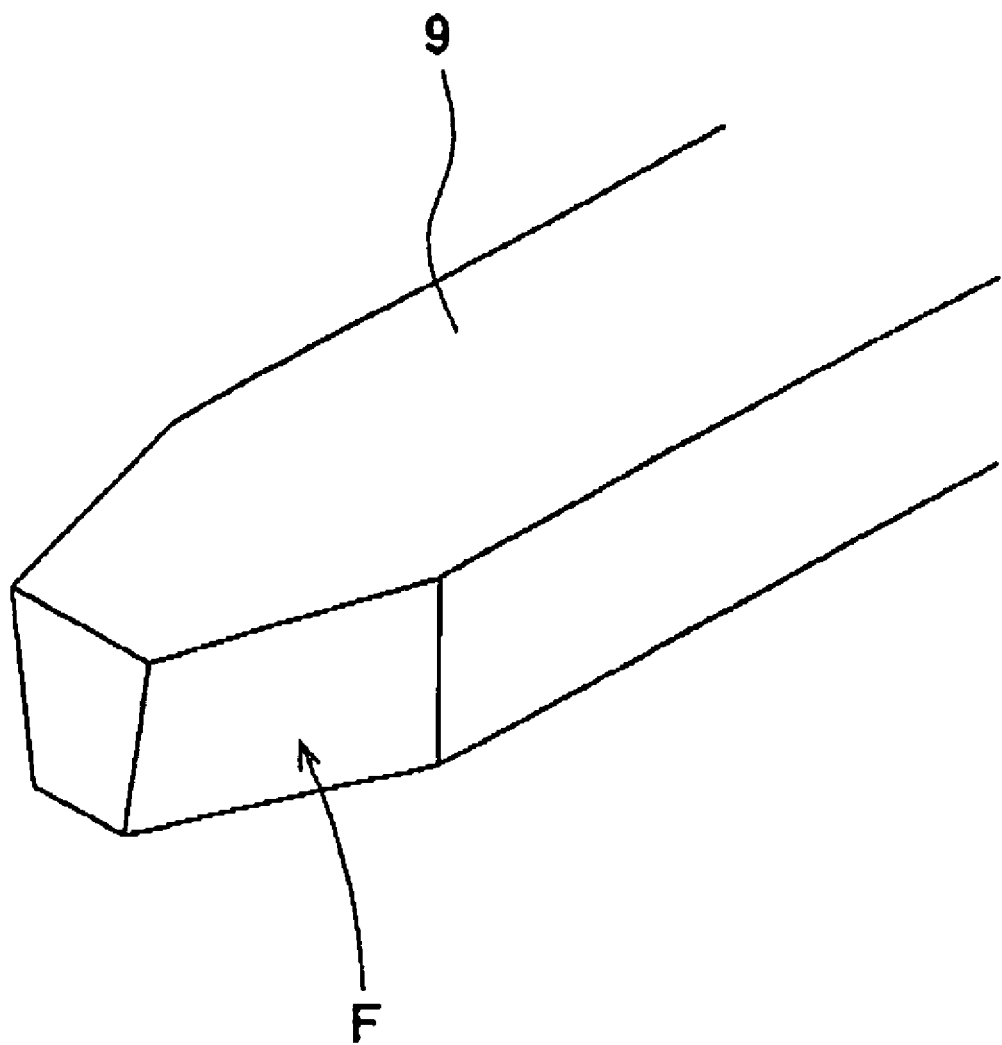
FIG. 3 is an explanation view showing an edge part of a punch with a taper.

The drag 7 has a cavity 7a corresponding to the first molded article W1. As shown in FIG. 3 punches 9.9 with tapers, which have taper surfaces F on the both sides of an edge part, are provided on a radial direction to a center of the drag 7. The punches 9.9 are set into the drag 7 in order to be capable of moving thereof into between straight dog clutch pawls 6.6 of the first molded article W1.

A back end of the punch 9 with tapers has an inclined cam surface and the inclined cam surface are contact with an inclined cam surface formed at the bottom of a depression cam 10 moving vertically. The punch 9 with tapers is pushed to a center direction by sending the depression cam 10 down.

The punch 9 with tapers is applied to a biasing force pushing outwards in a radial direction by a spring 9a and the depression cam 10 is applied to a biasing force pushing upwards in a lifting direction by a spring 10a and as a result, a top part of the depression cam 10 is projected from the drag 7 when the depression cam is uprised by the spring 10a.

On the other side, the cope 8 comprises an inner punch 8a and an outer punch 8b and the inner punch 8a is formed at a part corresponding to an opening surface of the cavity 7a of the drag 7.

The bottom part of the inner punch 8a is projected from the cope 8 by a spring 11 and when the pressure is stronger than a spring-load, the inner punch 8a is inserted into the outer punch 8b and a pressure is kept to balance the spring-load.

On the other hand, the outer punch 8b covers the range of the projected depression cam 10 and all pressure forces applied to the depression cam 10.

Figure 4A:
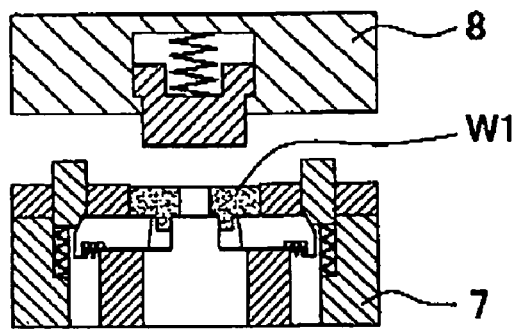
FIGS. 4A-4D are explanatory views showing the operation of a second step.
Figure 4B:
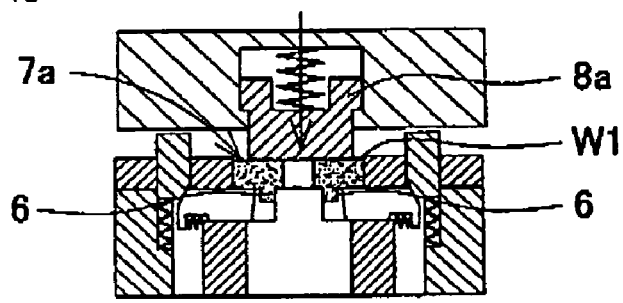
Figure 4C:
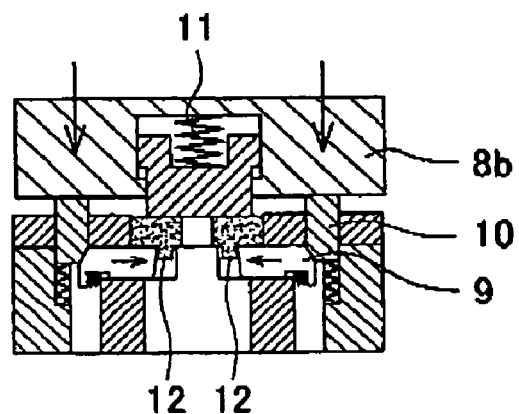

In the method of manufacturing a speed change gear with dog clutch pawls by using these molding devices a first molded article W1 is set in a cavity (as shown FIG. 4A). At the first step, the cope 8 is moved downwardly the first molded article W1 is pressed in the cavity 7a by the inner punch 8a, in result the gear part is restrained by the peripheral part of the cavity 7 (as shown in FIG. 4B). At the second step, the cope 8 is moved downwardly even more, resulting in the restrain, condition of the gear part being maintained because the spring 11 absorbs a pressure of the inner punch 8a. Subsequently, back tapers are formed on the engaging surfaces of a straight dog clutch pawl 6 when the outer punch 8b depresses downwardly the depression cam 10 and the punch 9 with tapers is inserted into between dog clutch pawls 6.6 (as shown in FIG. 4C).

Figure 4D:
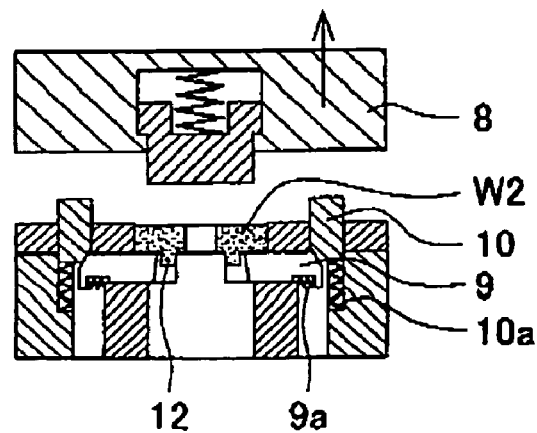

The depression cam 10 and the punch 9 with tapers return to the original position by a biasing force of a spring 10a and a spring 9a respectively when the cope 8 is moved upwardly and as a result, pressure to the depression cam 10 and the punch 9 with tapers is released (as shown in FIG. 4D).

Accordingly, back tapers are formed on the side surface of the straight dog clutch pawl 7 projected on the one side of the speed change gear part and it is able to pick up a second molded article W2 having a clutch pawl 12 with back tapers formed in this manner.

Figure 5:
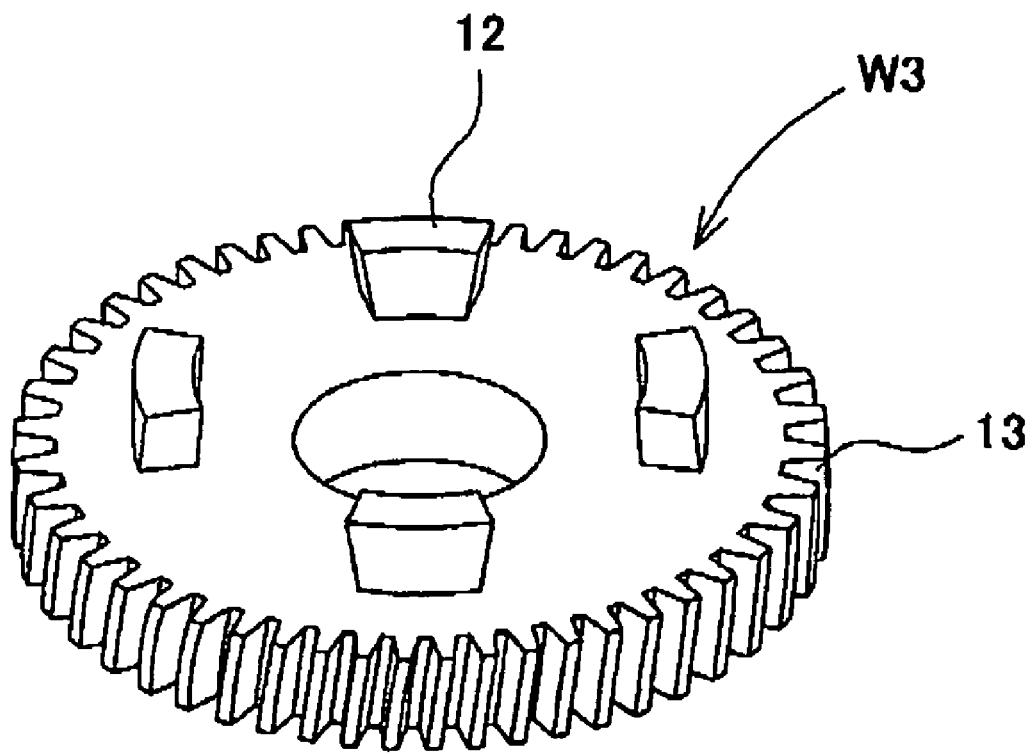
FIG. 5 is an explanatory view showing a product.

A tooth form 13 is formed on an outer peripheral surface of a gear part of the second molded article W2 by cutting and a product W3 having dog clutch pawl 12 with back tapers is provided as shown in FIG. 5.

By providing a tooth form on an inner peripheral surface of the disk form cavity of the drag 1, a tooth form and the straight dog clutch pawls of the first molded article may be formed by forging at the same time in the first step.

In the above described embodiment back tapers are formed by working out a side surface of a dog clutch pawl when a punch with tapers are moved into between dog clutch pawls from an outer part to a central part thereof on a radial direction at the second step and further, natural back tapers can be formed by depressing the dog clutch pawls in an axial direction.

Modified embodiments will be described below.

Figure 6A:
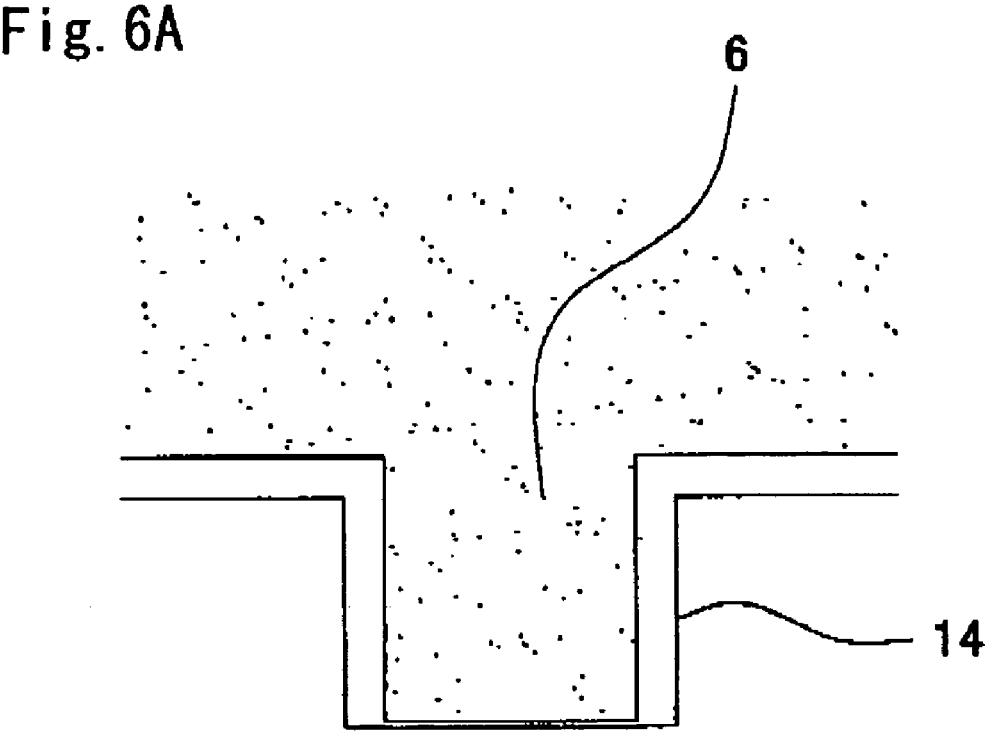
FIGS. 6A and 6B are explanatory views showing a modification of the second step.
Figure 6B:
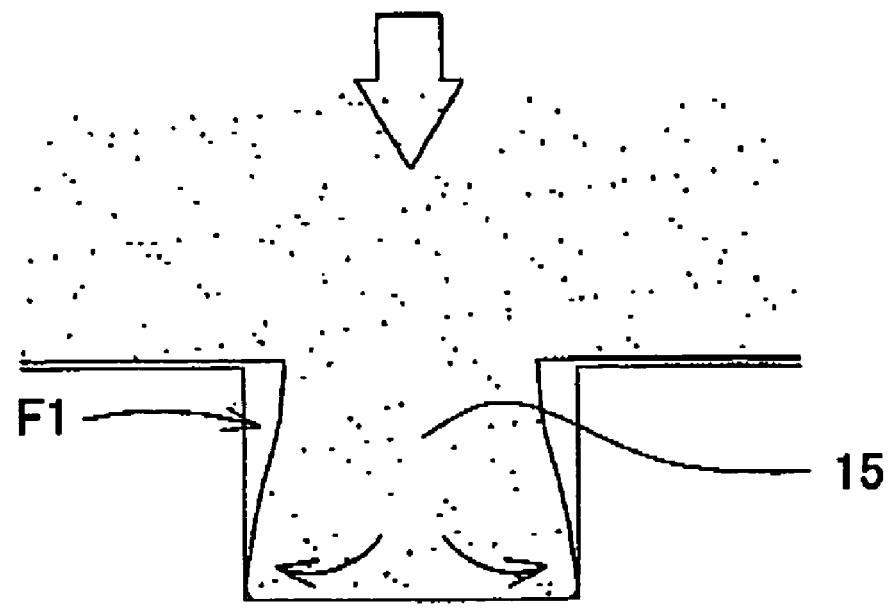

FIG. 6 is an explanation view showing a second step of a modified embodiment. In this step, a molding device which is similar to the device of the first step is used.

A difference between a first step and a second step is only that in the second step, a part corresponding to an extrusion hole is modified to a hole 14 for forming a back taper, which is slightly shallower i.e. short depth and one size larger i.e. wider than the extrusion hole 3 in the first step.

Straight dog clutch pawls 6 are depressed to a bottom surface of the hole for forming back taper and in result the straight dog clutch pawls 6 is crushed so as to expand a cross section area of an edge part of the straight dog clutch pawls 6 when a first molded article is set in such a forming device and the first molded article is depressed by a cope in an axial direction and a natural back taper surface F1 is formed.

In this manner, a dog clutch pawl 15 with a natural back taper surface F1 can be formed and such a dog clutch pawl with a natural back taper surface can be also formed by pressing a punch an edge part of a dog clutch pawl as a mean for depressing a dog clutch pawl in an axial direction.

According to this modified embodiment, it is possible to form a back taper form on the entire outer surface of a dog clutch gear pawl, but accuracy of a back taper form vary widely.

Figure 7A:
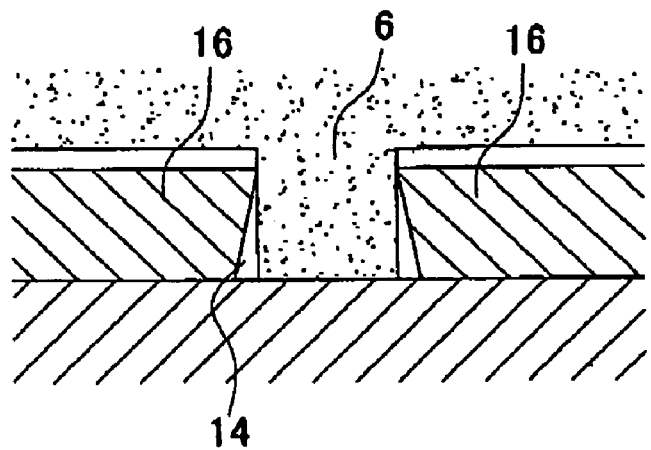
FIGS. 7A-7C are explanatory views showing a desired device which is used in a modification of the second step.
Figure 7B:
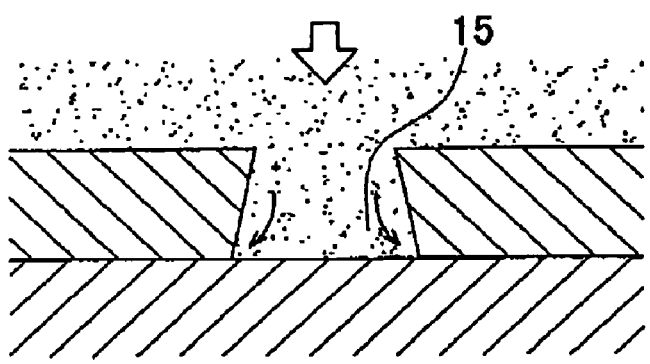
Figure 7C:
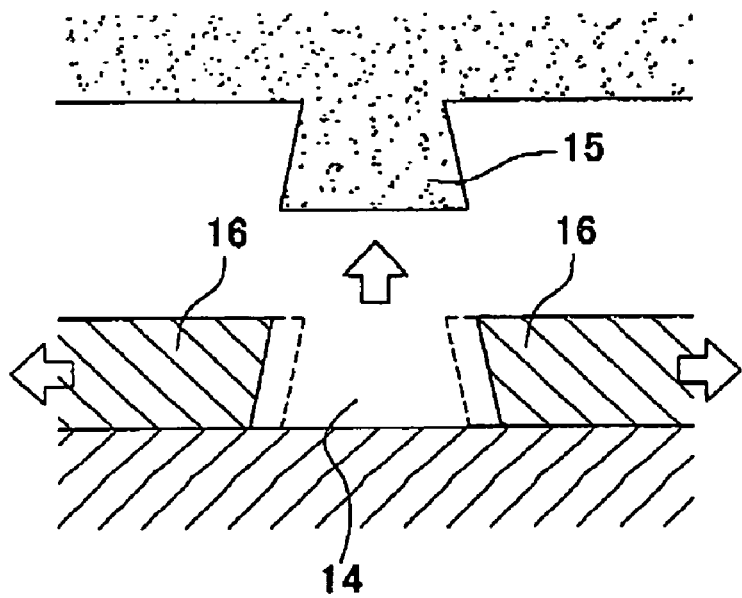

Therefore as shown in FIG. 7, it is desirable to use a device in which both side surfaces of the dog clutch pawl is constrained by a taper wall by extruding a slide blocks 16 with a taper in a hole 14 for forming a back taper and the slide blocks are departed from the hole for forming a back taper when a cope is moved upward and it is able to take out a dog clutch pawl with a back taper.

Thus, in any embodiment described above, it is able to mold a dog clutch pawl with a back taper and a tooth gear part integrally by forging and it is able to produce on a large scale in a short time and have no use cutting process.

Moreover, a dog clutch pawl with a back taper molded by a punch with a taper on the side surface and a dog clutch pawl, an outer peripheral surface of which is constrained by a slide block, have high accuracy and there is no dispersion.

The preferred embodiments of the present invention, as herein disclosed, are taken as some embodiments for explaining the present invention. It is to be understood that the present invention should not be restricted by these embodiments and any modifications and additions are possible so far as they are not beyond the technical idea or principle based on descriptions of the scope of the patent claims.

What is claimed is:

1. A speed change gear with dog clutch pawls comprising:
a gear body having a forged speed change gear part on a radially outer peripheral surface thereof,
forged dog clutch pawls projected axially from an axial side surface of the gear body, wherein said dog clutch pawls are provided with forged back tapers on at least an engaging surface thereof, the forged back tapers extending over an entire axial height of the respective pawls,
and wherein said dog clutch pawls with back tapers and said change gear part are integrally molded with said gear body.

2. A speed change gear with dog clutch pawls according to claim 1, wherein an axial end surface of the respective pawls is a flat surface.

3. A speed change gear with dog clutch pawls according to claim 2, wherein said dog clutch pawls comprise four pawls positioned at 90 degree intervals in the circumferential direction on said axial side surface.

4. A speed change gear with dog clutch pawls according to claim 3, comprising a helical forged speed change gear part.

5. A speed change gear with dog clutch pawls according to claim 1, wherein each of said forged dog clutch pawls are of a same shape.

6. A speed change gear with dog clutch pawls according to claim 5, wherein said pawls comprise press punched pawls.

* * * * *